(12) United States Patent
Lv et al.

(10) Patent No.: US 9,843,497 B2
(45) Date of Patent: Dec. 12, 2017

(54) METHOD AND DEVICE FOR LONG-TERM STORAGE OF CROSS-DOMAIN PATH INFORMATION

(71) Applicant: ZTE Corporation, Shenzhen (CN)

(72) Inventors: Wenxiang Lv, Shenzhen (CN); Jiayu Wang, Shenzhen (CN); Gang Lu, Shenzhen (CN); Zhihong Wang, Shenzhen (CN); Xuping Cao, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 164 days.

(21) Appl. No.: 14/770,931

(22) PCT Filed: Feb. 28, 2014

(86) PCT No.: PCT/CN2014/072719
§ 371 (c)(1),
(2) Date: Aug. 27, 2015

(87) PCT Pub. No.: WO2014/131370
PCT Pub. Date: Sep. 4, 2014

(65) Prior Publication Data
US 2016/0006644 A1  Jan. 7, 2016

(30) Foreign Application Priority Data
Feb. 28, 2013 (CN) .......................... 2013 1 0066446

(51) Int. Cl.
*G06F 11/00* (2006.01)
*H04L 12/751* (2013.01)
(Continued)

(52) U.S. Cl.
CPC .............. *H04L 45/02* (2013.01); *H04L 41/12* (2013.01); *H04L 41/28* (2013.01); *H04L 45/42* (2013.01); *H04L 41/145* (2013.01)

(58) Field of Classification Search
CPC ......... H04L 41/28; H04L 45/02; H04L 41/12; H04L 45/42; H04L 41/145
(Continued)

(56) References Cited

U.S. PATENT DOCUMENTS 7,558,276 B2 * 7/2009 Vasseur ................... H04L 45/04
370/248
2006/0098657 A1 * 5/2006 Vasseur ................... H04L 45/04
370/392

FOREIGN PATENT DOCUMENTS

| CN | 101095311 A | 12/2007 |
|---|---|---|
| EP | 2073462 A1 | 6/2009 |
| WO | 2010145229 | 12/2010 |

OTHER PUBLICATIONS

International Search Report for corresponding application PCT/CN2014/072719 filed Feb. 28, 2014; dated Jun. 5, 2014.
(Continued)

*Primary Examiner* — Kenneth R Coulter
(74) *Attorney, Agent, or Firm* — Cantor Colburn LLP

(57) ABSTRACT

A method and device for long-term storage of cross-domain path information are provided. The method is applied on a stateless PCE. In the method, a first PCE computes a path; a path head node sends, to the first PCE, query information for querying intra-domain path information of the first domain corresponding to a first PATH-KEY, generates, on the basis of a query result returned by the first PCE, a third PATH-KEY having a unique identifier and corresponding to the intra-domain path information of the first domain and stores the third PATH-KEY; the path head node sends, to a head node in a second domain, an inter-domain path estab-
(Continued)

lishment signalling comprising the third PATH-KEY and a second PATH-KEY, to make the head node in the second domain send, to a second PCE, query information for querying intra-domain path information of the second domain corresponding to the second PATH-KEY, generate, on the basis of a query result returned by the second PCE, a fourth PATH-KEY having a unique identifier and corresponding to the intra-domain path information of the second domain, and store the fourth PATH-KEY; and, the path head node modifies information of the path from the path head node to the path tail node on the basis of a reverse signalling returned by the path tail node and comprising the third PATH-KEY and the fourth PATH-KEY.

10 Claims, 2 Drawing Sheets

(51) Int. Cl.
  *H04L 12/717* (2013.01)
  *H04L 12/24* (2006.01)
(58) Field of Classification Search
  USPC .................................... 709/242, 238, 230
  See application file for complete search history.

(56) References Cited

OTHER PUBLICATIONS

European Search Report for corresponding application PCT/CN2014/072719; dated Dec. 16, 2015; pp. 7.

* cited by examiner

METHOD AND DEVICE FOR LONG-TERM STORAGE OF CROSS-DOMAIN PATH INFORMATION

TECHNICAL FIELD

The present disclosure relates to the technical field of communications, and in particular to a method and device for long-term storage of cross-domain path information.

BACKGROUND

In the process of multi-domain path computation, if there is no mutual trust among domains, internal path information of a domain needs to be hidden from other domains, i.e., path confidentiality is needed.

When a PCE (Path Computation Element) provides path computation, the path confidentiality is realized through a mechanism of a PATH-KEY (path key), which technology is specified in RFC5520. The general processing of the technology is described as follows.

A PCE computes a path in a domain, and before returning a path computation result to a PCE in another domain, a PATH-KEY sub-object may be adopted to replace a detailed intra-domain path. In front of the PATH-KEY sub-object, a TE Router ID (traffic engineering router identifier) of an ingress boundary node is reserved as one hop. In the standard, it is suggested that the PATH-KEY information be reserved in the PCE for ten minutes.

In the process of path establishment through signalling, when the ingress boundary node is reached, the ingress boundary node then requests to acquire an intra-domain path corresponding to the PATH-KEY from the corresponding PCE.

In addition, it is mentioned in RFC5521 that a PATH-KEY can be used to perform intra-domain separation.

The standard has a simple description of the use of PATH-KEY, but it does not mention the method for storing the PATH-KEY for a long term. However, it is important to store PATH-KEY information for a long term, for example, in the following situation.

After a long time, the PATH-KEY in the PCE already does not exist. However, it is necessary at the moment to initiate end-to-end path recovery or optimization among domains. If a new working path and an old protection path pass through the same domain, when computing the new working path in the domain, it is necessary to separate the new working path from the old protection path associated therewith. In this case, it is needed to query intra-domain path information corresponding to the old protection path via a PATH-KEY stored for a long term.

SUMMARY

In order to solve the problem that path information cannot be stored for a long term, the embodiments of the present disclosure provide a method and device for long-term storage of cross-domain path information.

In order to achieve the above-mentioned purpose, the technical solution adopted by the present disclosure is: a method for long-term storage of cross-domain path information, which is applied on a stateless PCE and includes the following steps: a path head node sends, via a first PCE corresponding to a first domain, path request information including the path head node and a path tail node to a second PCE corresponding to a second domain where the path tail node is located, to enable the first PCE to compute an intra-domain path of the first domain and generate a first PATH-KEY corresponding to the intra-domain path of the first domain, compute a path from the path head node to the path tail node according to path response information returned by the second PCE and including a second PATH-KEY corresponding to an intra-domain path of the second domain, and send information of the path from the path head node to the path tail node to the path head node; the path head node sends, to the first PCE, query information for querying intra-domain path information of the first domain corresponding to the first PATH-KEY, generates, according to a query result returned by the first PCE, a third PATH-KEY having a unique identifier and corresponding to the intra-domain path information of the first domain, and stores the third PATH-KEY; the path head node sends to a head node in the second domain an inter-domain path establishment signalling including the third PATH-KEY and the second PATH-KEY, to enable the head node in the second domain send, to the second PCE, query information for querying intra-domain path information of the second domain corresponding to the second PATH-KEY, generate, according to a query result returned by the second PCE, a fourth PATH-KEY having a unique identifier and corresponding to the intra-domain path information of the second domain, and store the fourth PATH-KEY; and the path head node modifies the information of the path from the path head node to the path tail node according to a reverse signalling returned by the path tail node and including the third PATH-KEY and the fourth PATH-KEY.

In an example embodiment, the method further includes: the path head node sends to the second PCE a signalling including path recovery or path optimization via the first PCE, to enable the first PCE to perform recovery or optimization on the path between the path head node and the path tail node according to the third PATH-KEY sent by the path head node and the fourth PATH-KEY sent by the head node in the second domain.

In an example embodiment, when the path established between the path head node and the path tail node is a protection path, the first path request information includes the path head node, the path tail node and working path information associated with the protection path.

In an example embodiment, when the path established between the path head node and the path tail node is a protection path, the second PATH-KEY is generated by the second PCE according to a querying result obtained after the second PCE queries, from the head node in the second domain, information of a working path inside the second domain.

In an example embodiment, when the path established between the path head node and the path tail node is a protection path, the first PATH-KEY is generated by the first PCE according to a protection path inside the first domain which is computed based on a query result obtained after the first PCE queries, from the path head node, information of a working path inside the first domain.

The present disclosure further provides a device for long-term storage of cross-domain path information, including: a first sending component configured to send, by a path head node, path request information including the path head node and a path tail node to a second PCE corresponding to a second domain where the path tail node is located via a first PCE corresponding to a first domain, so that the first PCE computes a path according to path response information returned by the second PCE and including a second PATH-KEY corresponding to an intra-domain path of the second domain, and sends information of the path from the path head node to the path tail node to the path head node; a third PATH-KEY generation component configured to send, by the path head node to the first PCE, query information for querying intra-domain path information of the first domain corresponding to the first PATH-KEY, generate, by the path head node, a third PATH-KEY having a unique identifier and corresponding to the intra-domain path information of the first domain according to a query result returned by the first PCE, and store, by the path head node, the third PATH-KEY; a second sending component configured to send, by the path head node, to a head node in the second domain an inter-domain path establishment signalling including the third PATH-KEY and the second PATH-KEY, so that the head node in the second domain sends, to the second PCE, query information for querying intra-domain path information of the second domain corresponding to the second PATH-KEY, generates a fourth PATH-KEY having a unique identifier and corresponding to the intra-domain path information of the second domain according to a query result returned by the second PCE, and stores the fourth PATH-KEY; and a path information updating component configured to modify, by the path head node, the information of the path from the path head node to the path tail node according to a reverse signalling returned by the path tail node and including the third PATH-KEY and the fourth PATH-KEY.

In an example embodiment, the device includes: a path recovery or optimization component configured to send, by the path head node, to the second PCE a signalling including path recovery or path optimization via the first PCE, so that the first PCE performs recovery or optimization on the path between the path head node and the path tail node according to the third PATH-KEY sent by the path head node and the fourth PATH-KEY sent by the head node in the second domain.

In an example embodiment, when the path established between the path head node and the path tail node is a protection path, the first path request information includes the path head node, the path tail node and working path information associated with the protection path.

In an example embodiment, when the path established between the path head node and the path tail node is a protection path, the second PATH-KEY is generated by the second PCE according to a querying result obtained after the second PCE queries, from the head node in the second domain, information of a working path inside the second domain.

In an example embodiment, when the path established between the path head node and the path tail node is a protection path, the information of the path from the path head node to the path tail node is obtained according to the following procedure: the first PCE querying, from the path head node, information of a working path inside the first domain, computing a protection path inside the first domain according to a querying result, generating the first PATH-KEY corresponding to the protection path inside the first domain, and computing the information of the path from the path head node to the path tail node according to the path response information sent by the second PCE and comprising the second PATH-KEY.

The beneficial effects of the embodiments of the present disclosure are: PATH-KEY information corresponding to intra-domain paths can be stored for a long term, which facilitates the recovery and optimization of the inter-domain paths.

DETAILED DESCRIPTION OF THE EMBODIMENTS

Description is made in detail to the structure and principle of the present disclosure in conjunction with the accompanying drawings, and the embodiments are just used for explaining the present disclosure, but not for limiting the protection scope of the present disclosure.

Figure 1:
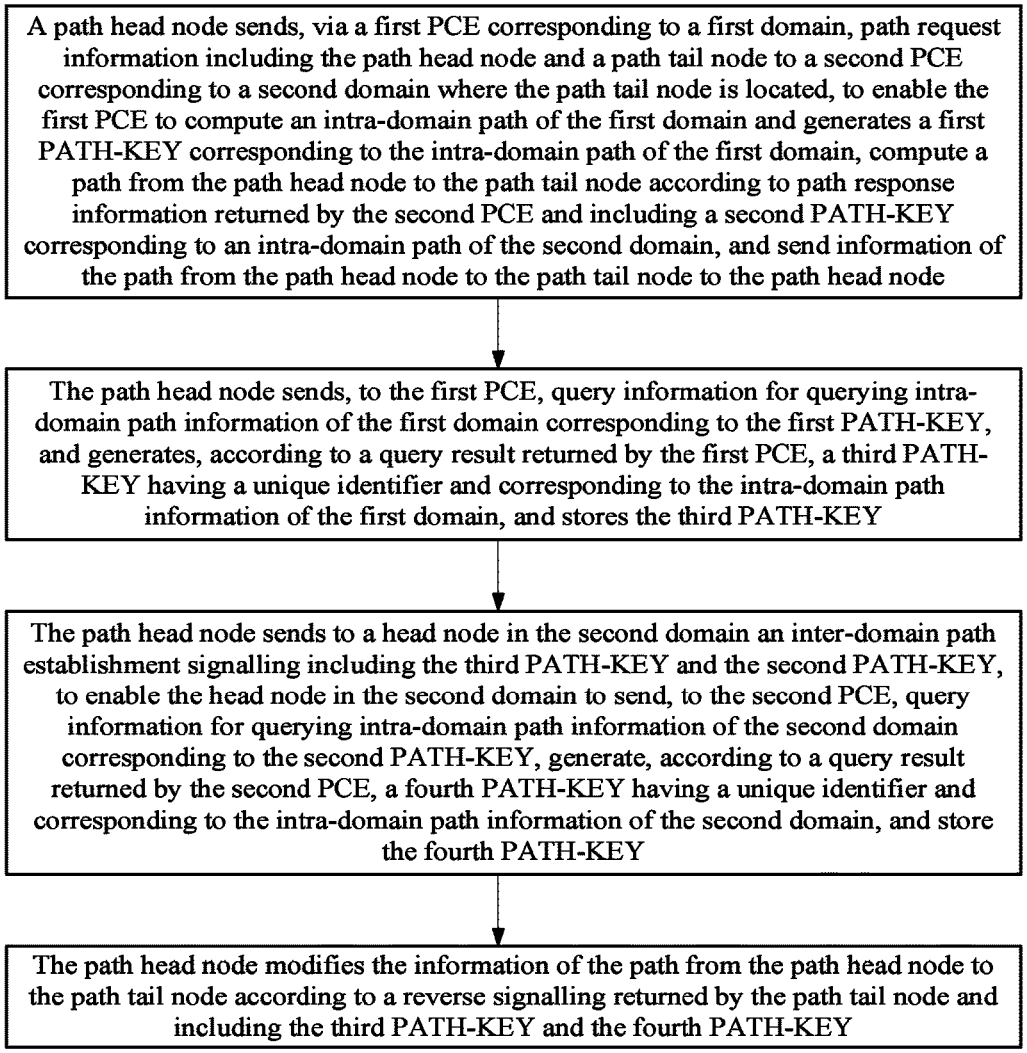
FIG. 1 is a flowchart of a method for long-term storage of cross-domain path information according to an embodiment of the present disclosure.

As shown in FIG. 1, in order to solve the problem that path information cannot be stored for a long term, the present embodiment provides a method for long-term storage of cross-domain path information, which is applied on a stateless PCE and includes the following steps:

a path head node sends, via a first PCE corresponding to a first domain, path request information including the path head node and a path tail node to a second PCE corresponding to a second domain where the path tail node is located, to enable the first PCE to compute an intra-domain path of the first domain and generate a first PATH-KEY corresponding to the intra-domain path of the first domain, compute a path from the path head node to the path tail node according to path response information returned by the second PCE and including a second PATH-KEY corresponding to an intra-domain path of the second domain, and send information of the path from the path head node to the path tail node to the path head node;

the path head node sends, to the first PCE, query information for querying intra-domain path information of the first domain corresponding to the first PATH-KEY, and generates, according to a query result returned by the first PCE, a third PATH-KEY having a unique identifier and corresponding to the intra-domain path information of the first domain, and stores the third PATH-KEY;

the path head node sends, to a head node in the second domain, an inter-domain path establishment signalling including the third PATH-KEY and the second PATH-KEY, to enable the head node in the second domain to send, to the second PCE, query information for querying intra-domain path information of the second domain corresponding to the second PATH-KEY, generate, according to a query result returned by the second PCE, a fourth PATH-KEY having a unique identifier and corresponding to the intra-domain path information of the second domain, and store the fourth PATH-KEY; and the path head node modifies the information of the path from the path head node to the path tail node according to a reverse signalling returned by the path tail node and including the third PATH-KEY and the fourth PATH-KEY.

PCEs are classified into stateful PCEs and stateless PCEs. At present, the stateless PCEs are more widely applied, and the disclosure is also realized based on the stateless PCEs. A stateless PCE does not have a database, and cannot store a PATH-KEY and corresponding intra-domain path information for a long term.

However, in the method for long-term storage of cross-domain path information of the present embodiment, the first PATH-KEY is stored into a path head node of a corresponding first domain, and the path head node generates a third PATH-KEY having a unique identifier according to intra-domain path information of the first domain corresponding to the first PATH-KEY, and stores the third PATH-KEY for a long term; a head node in a second domain generates a fourth PATH-KEY having a unique identifier and corresponding to the intra-domain path information of the second domain according to intra-domain path information of the second domain corresponding to a second PATH-KEY, and stores the fourth PATH-KEY. In this way, the operation such as recovery or optimization of a path from the path head node to the path tail node passing through the first domain and the second domain is facilitated.

It should be noted that the path between the path head node and the path tail node is not limited to only passing through the first domain and the second domain.

The method for long-term storage of cross-domain path information in the present embodiment further includes: the path head node sends to the above-mentioned second PCE a signalling including the path recovery or path optimization via the above-mentioned first PCE, so that the above-mentioned first PCE performs recovery or optimization on the path between the path head node and the path tail node according to the third PATH-KEY sent by the path head node and the fourth PATH-KEY sent by the head node in the second domain.

When there is a need to perform an operation such as recovery or optimization on the path between the path head node and the path tail node, the PCE of each of the domains, which the path from the path head node to the path tail node passes, sends the PATH-KEY information corresponding to the intra-domain path of this domain to a PCE of a domain where the path head node is located, and the PCE of the domain where the path head node is located queries specific path information of the corresponding domain from the PCE of the corresponding domain according to PATH-KEY information corresponding to the intra-domain path of each PCE of the domains passed from the path head node to the path tail node, so as to recover and optimize the corresponding path.

Two associated paths are generally established between the path head node and the path tail node, with one being a working path and the other being a protection path.

Figure 2:
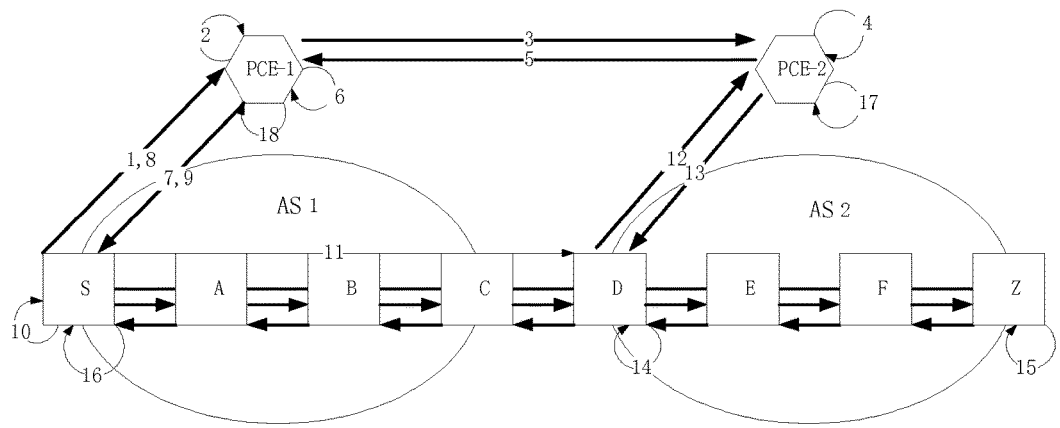
FIG. 2 is a flowchart of cross-domain working path establishment according to an embodiment of the present disclosure.

The establishment flow of the working path between the path head node and the path tail node is as shown in FIG. 2. In order to illustrate the establishment process of the working path in detail, the specific contents of steps 1-18 are explained in a table form as follows:

| Step | Send | Receive | Description |
| --- | --- | --- | --- |
| 1 | S node | PCE-1 | Cross-domain path request: {S, Z} |
| 2 | PCE-1 | | Compute domain sequence: {AS1, AS2} |
| 3 | PCE-1 | PCE-2 | Cross-domain path request: {S, Z} Domain sequence: {AS1, AS2} |
| 4 | PCE-2 | | Compute the path inside AS2 domain: PKS1 = {D, E, F, Z} |
| 5 | PCE-2 | PCE-1 | Path replied from AS2 domain: (D, PKS1, Z} |
| 6 | PCE-1 | | Compute the path inside AS1 domain: PKS2 = {S, A, B, C}; Joint the path inside AS2 domain and select a final end to end path: {S, PKS2, C, D, PKS1, Z} |
| 7 | PCE-1 | S node | Cross-domain path response: {S, PKS2, C, D, PKS1, Z} |
| 8 | S node | PCE-1 | Query a detailed route of PKS2 |
| 9 | PCE-1 | S node | PKS2 query response: PKS2 = {S, A, B, C} |
| 10 | S node | | Generate and store a new PKS22 = {S, A, B, C} |
| 11 | S node | D node | PKS22 and PKS1 are delivered to D node via a signalling, and the D node finds the next hop in an ERO is PKS1 |
| 12 | D node | PCE-2 | Query a detailed route of PKS1 |
| 13 | PCE-2 | D node | PKS1 query response: PKS1 = {D, E, F, Z} |
| 14 | D node | | Generate and store a PKS11 = {D, E, F, Z} |
| 15 | Z node | | Signalling in a PATH direction gets through, and a tail node adds the new PKS22 and PKS11 into a reverse signalling. |
| 16 | S node | | A head node updates the PKS in the entire end-to-end path. |
| 17 | PCE-2 | PCE-2 | After a timer times out, delete PKS1 |
| 18 | PCE-1 | PCE-1 | After a timer times out, delete PKS2 |

Corresponding PATH-KEY information in the first PCE and the second PCE will be deleted within a certain period of time; however, the third PATH-KEY in the head node S in the first domain (i.e., a path head node) and the fourth PATH-KEY in the head node D in the second domain will be stored for a long term, which facilitates the recovery or optimization of the path between the path head node and the path tail node.

It should be noted that PSK1 in the table is the second PATH-KEY, PSK2 is the first PATH-KEY, PKS22 is the third PATH-KEY, and PKS11 is the fourth PATH-KEY.

When the path established between the path head node and the path tail node is a protection path, first path request information includes the path head node, the path tail node and working path information associated with the protection path.

When the path established between the path head node and the path tail node is a protection path, the second PATH-KEY is generated by the second PCE according to a querying result obtained after the second PCE queries, from the head node in the second domain, information of a working path inside the second domain.

When the path established between the path head node and the path tail node is a protection path, the first PATH-KEY is generated by the first PCE according to a protection path inside the first domain which is computed based on a query result obtained after the first PCE queries, from the path head node, information of a working path inside the first domain.

Figure 3:
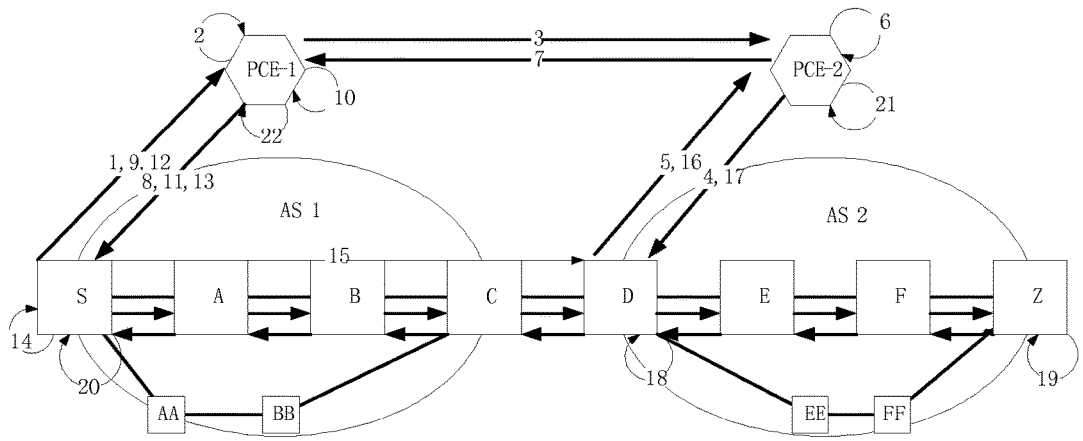
FIG. 3 is a flowchart of cross-domain protection path establishment according to an embodiment of the present disclosure.

In the present embodiment, the establishment flow of the protection path is as shown in FIG. 3. In order to illustrate the establishment process of the protection path in detail, the specific contents of steps 1-22 are explained in a table form as follows:

| Step | Send | Receive | Description |
| --- | --- | --- | --- |
| 1 | S node | PCE-1 | Seek for a cross-domain protection path: {S, Z}, Associated working path: {S, PKS22, C, D, PKS11, Z} |
| 2 | PCE-1 | | Compute domain sequence: {AS1, AS2} |
| 3 | PCE-1 | PCE-2 | Cross-domain path request: {S, Z} Domain sequence: (AS1, AS2} Associated path: {S, PKS22, C, D, PKS11, Z} |
| 4 | PCE2 | D | Query an intra-domain path corresponding to PKS11; |
| 5 | D | PCE2 | PKS11 query response: PKS11 = {D, E, F, Z} |
| 6 | PCE-2 | | Compute the path inside AS2 domain: PKS1 = {D, EE, FF, Z} |
| 7 | PCE-2 | PCE-1 | Path replied from AS2 domain: {D, PKS1, Z} |
| 8 | PCE-1 | S | Query an intra-domain path corresponding to PKS22; |
| 9 | S | PCE1 | PKS22 query response: PKS22 = {S, A, B, C} |
| 10 | PCE-1 | | Compute the path inside AS1 domain: PKS2 = {S, AA, BB, C}; |

| Step | Send | Receive | Description |
|---|---|---|---|
| | | | Joint the path inside AS2 domain and select a final end to end path: {S, PKS2, C, D, PKS1, Z} |
| 11 | PCE-1 | S node | Cross-domain path response: {S, PKS2, C, D, PKS1, Z} |
| 12 | S node | PCE-1 | Query a detailed route of PKS2 |
| 13 | PCE-1 | S node | PKS2 query response: PKS2 = {S, AA, BB, C} |
| 14 | S node | | Generate and store a new PKS222 = {S, AA, BB, C} |
| 15 | S node | D node | PKS222 and PKS1 are delivered to D node via a signalling, and the D node finds the next hop in an ERO is PKS1 |
| 16 | D node | PCE-2 | Query a detailed route of PKS1 |
| 17 | PCE-2 | D node | PKS1 query response: PKS1 = {D, EE, FF, Z} |
| 18 | D node | | Generate and store a new PKS111 = {D, EE, FF, Z} |
| 19 | Z node | | A signalling in a PATH direction gets through, and a tail node adds a new PKS222 and PKS111 into a reverse signalling. |
| 20 | S node | | A head node updates the PKS in the entire end-to-end path. |
| 21 | PCE-2 | PCE-2 | After a timer times out, delete PKS1 |
| 22 | PCE-1 | PCE-1 | After a timer times out, delete PKS2 |

Corresponding PATH-KEY information in the first PCE and the second PCE will be deleted within a certain period of time; however, the third PATH-KEY of the head node S in the first domain (i.e., a path head node) and the fourth PATH-KEY of the head node D in the second domain will be stored for a long term, which facilitates the recovery or optimization of a path between the path head node and the path tail node.

It should be noted that PSK1 in the table is the second PATH-KEY, PSK2 is the first PATH-KEY, PKS22 is the corresponding working path information inside the first domain, PKS11 is the corresponding working path information inside the second domain, PKS222 is the third PATH-KEY, and PKS111 is the fourth PATH-KEY.

The embodiment of the present disclosure further provides a device for long-term storage of cross-domain path information, including:

a first sending component configured to send, by a path head node, path request information including the path head node and a path tail node to a second PCE corresponding to a second domain where the path tail node is located via a first PCE corresponding to a first domain, so that the first PCE computes a path according to path response information returned by the second PCE and including a second PATH-KEY corresponding to an intra-domain path of the second domain, and sends information of the path from the path head node to the path tail node to the path head node; a third PATH-KEY generation component configured to send, by the path head node to the first PCE, query information for querying intra-domain path information of the first domain corresponding to the first PATH-KEY, and generate a third PATH-KEY having a unique identifier and corresponding to the intra-domain path information of the first domain according to a query result returned by the first PCE, and store the third PATH-KEY; a second sending component configured to send, by the path head node, to a head node in the second domain an inter-domain path establishment signalling including the third PATH-KEY and the second PATH-KEY, so that the head node in the second domain sends, to the second PCE, query information for querying intra-domain path information of the second domain corresponding to the second PATH-KEY, generates a fourth PATH-KEY having a unique identifier and corresponding to the intra-domain path information of the second domain according to a query result returned by the second PCE, and stores the fourth PATH-KEY; and a path information updating component configured to modify, by the path head node, the information of the path from the path head node to the path tail node according to a reverse signalling returned by the path tail node and including the third PATH-KEY and the fourth PATH-KEY.

The device for long-term storage of the cross-domain path information further includes: a path recovery or optimization component configured to send, by the path head node, to the second PCE a signalling including path recovery or path optimization via the first PCE, so that the first PCE performs recovery and optimization on the path between the path head node and the path tail node according to the third PATH-KEY sent by the path head node and the fourth PATH-KEY sent by the head node in the second domain.

When the path established between the path head node and the path tail node is a protection path, first path request information includes the path head node, the path tail node and working path information associated with the protection path.

When the path established between the path head node and the path tail node is a protection path, the second PATH-KEY is generated by the second PCE according to a querying result obtained after the second PCE queries, from the head node in the second domain, information of a working path inside the second domain.

When the path established between the path head node and the path tail node is a protection path, the information of the path from the path head node to the path tail node is obtained according to the following procedure: the first PCE querying, from the path head node, information of a working path inside the first domain, computing a protection path inside the first domain according to a querying result, generating the first PATH-KEY corresponding to the protection path inside the first domain, and computing the information of the path from the path head node to the path tail node according to the path response information sent by the second PCE and including the second PATH-KEY.

Persons skilled in the art may understand that all or some of the steps in the above-mentioned method can be completed by instructing related hardware to complete via a program, and the program can be stored into a computer-readable storage medium, such as a read-only memory, a magnetic disc or a compact disc. Selectively, all or some of the steps in the above-mentioned embodiments may also be realized by using one or more integrated circuits. Accordingly, each component in the above-mentioned embodiment can be realized by adopting a form of hardware, and can also be realized by adopting a form of software function component. The present disclosure is not restricted to any combination of hardware and software with a particular form.

Certainly, the present disclosure may have various other embodiments; in the case of obeying the spirits and nature of the present disclosure, those skilled in the art can make various corresponding modifies and deformations according to the present disclosure; however, any modification, equivalent replacement, or improvement made within the principle of the present disclosure shall all fall within the protection scope defined by the claims of the present disclosure.

INDUSTRIAL APPLICABILITY

By means of the above-mentioned method and device for long-term storage of cross-domain path information, the following beneficial effects can be achieved: the PATH-KEY information corresponding to intra-domain paths can be stored for a long term, which facilitates the recovery and optimization of the inter-domain paths.

The invention claimed is:

1. A method for long-term storage of cross-domain path information, wherein the method is applied on a stateless path computation element (PCE) and comprises:
   sending, by a path head node, path request information comprising the path head node and a path tail node to a second PCE corresponding to a second domain where the path tail node is located via a first PCE corresponding to a first domain, to enable the first PCE to compute an intra-domain path of the first domain and generate a first PATH-KEY corresponding to the intra-domain path of the first domain, compute a path from the path head node to the path tail node according to path response information returned by the second PCE and comprising a second PATH-KEY corresponding to an intra-domain path of the second domain, and send information of the path from the path head node to the path tail node to the path head node;
   sending, by the path head node to the first PCE, query information for querying intra-domain path information of the first domain corresponding to the first PATH-KEY, generating, according to a query result returned by the first PCE, a third PATH-KEY having a first unique identifier and corresponding to the intra-domain path information of the first domain, and storing the third PATH-KEY;
   sending, by the path head node, to a head node in the second domain an inter-domain path establishment signalling comprising the third PATH-KEY and the second PATH-KEY, to enable the head node in the second domain to send, to the second PCE, query information for querying intra-domain path information of the second domain corresponding to the second PATH-KEY, generate, according to a query result returned by the second PCE, a fourth PATH-KEY having a second unique identifier and corresponding to the intra-domain path information of the second domain, and store the fourth PATH-KEY; and
   modifying, by the path head node, the information of the path from the path head node to the path tail node according to a reverse signalling returned by the path tail node and comprising the third PATH-KEY and the fourth PATH-KEY.

2. The method for long-term storage of cross-domain path information according to claim 1, wherein the method further comprises: sending, by the path head node, to the second PCE a signalling comprising path recovery or path optimization via the first PCE, to enable the first PCE to perform recovery or optimization on the path between the path head node and the path tail node according to the third PATH-KEY sent by the path head node and the fourth PATH-KEY sent by the head node in the second domain.

3. The method for long-term storage of cross-domain path information according to claim 1, wherein when the path established between the path head node and the path tail node is a protection path, the path request information comprises the path head node, the path tail node and working path information associated with the protection path.

4. The method for long-term storage of cross-domain path information according to claim 1, wherein when the path established between the path head node and the path tail node is a protection path, the second PATH-KEY is generated by the second PCE according to a querying result obtained after the second PCE queries, from the head node in the second domain, information of a working path inside the second domain.

5. The method for long-term storage of cross-domain path information according to claim 1, wherein when the path established between the path head node and the path tail node is a protection path,
   the first PATH-KEY is generated by the first PCE according to a protection path inside the first domain which is computed based on a query result obtained after the first PCE queries, from the path head node, information of a working path inside the first domain.

6. A device for long-term storage of cross-domain path information, comprising:
   a first sending component configured to send, by a path head node, path request information comprising the path head node and a path tail node to a second path computation element (PCE) corresponding to a second domain where the path tail node is located via a first PCE corresponding to a first domain, so that the first PCE computes a path according to path response information returned by the second PCE and comprising a second PATH-KEY corresponding to an intra-domain path of the second domain, and sends information of the path from the path head node to the path tail node to the path head node;
   a third PATH-KEY generation component configured to send, by the path head node to the first PCE, query information for querying intra-domain path information of the first domain corresponding to a first PATH-KEY, generate, by the path head node, the third PATH-KEY having a first unique identifier and corresponding to the intra-domain path information of the first domain according to a query result returned by the first PCE, and store, by the path head node, the third PATH-KEY;
   a second sending component configured to send, by the path head node, to a head node in the second domain an inter-domain path establishment signalling comprising the third PATH-KEY and the second PATH-KEY, so that the head node in the second domain sends, to the second PCE, query information for querying intra-domain path information of the second domain corresponding to the second PATH-KEY, generates a fourth PATH-KEY having a second unique identifier and corresponding to the intra-domain path information of the second domain according to a query result returned by the second PCE and stores the fourth PATH-KEY; and
   a path information updating component configured to modify, by the path head node, the information of the path from the path head node to the path tail node according to a reverse signalling returned by the path tail node and comprising the third PATH-KEY and the fourth PATH-KEY.

7. The device for long-term storage of cross-domain path information according to claim 6, wherein the device comprises: a path recovery or optimization component configured to send, by the path head node, to the second PCE a signalling comprising path recovery or path optimization via the first PCE, so that the first PCE performs recovery or optimization on the path between the path head node and the path tail node according to the third PATH-KEY sent by the path head node and the fourth PATH-KEY sent by the head node in the second domain.

8. The device for long-term storage of cross-domain path information according to claim 6, wherein when the path established between the path head node and the path tail node is a protection path, the path request information comprises the path head node, the path tail node and working path information associated with the protection path.

9. The device for long-term storage of cross-domain path information according to claim 6, wherein when the path established between the path head node and the path tail node is a protection path,
   the second PATH-KEY is generated by the second PCE according to a querying result obtained after the second PCE queries, from the head node in the second domain, information of a working path inside the second domain.

10. The device for long-term storage of cross-domain path information according to claim 6, wherein when the path established between the path head node and the path tail node is a protection path,
    the information of the path from the path head node to the path tail node is obtained according to the following procedure: the first PCE querying, from the path head node, information of a working path inside the first domain, computing a protection path inside the first domain according to a querying result, generating the first PATH-KEY corresponding to the protection path inside the first domain, and computing the information of the path from the path head node to the path tail node according to the path response information sent by the second PCE and comprising the second PATH-KEY.

\* \* \* \* \*